March 19, 1957    F. MÜLLER    2,785,886
METHOD AND APPARATUS FOR PREHEATING CEMENT
RAW MATERIAL BY KILN EXIT GASES
Filed Dec. 1, 1953    5 Sheets-Sheet 1

FIG. 1.

INVENTOR.
Franz Müller
BY
Knight Bros.
ATTORNEYS

March 19, 1957 F. MÜLLER 2,785,886
METHOD AND APPARATUS FOR PREHEATING CEMENT
RAW MATERIAL BY KILN EXIT GASES
Filed Dec. 1, 1953 5 Sheets-Sheet 2

INVENTOR.
Franz Müller
BY
Knight Bros.
ATTORNEYS

INVENTOR.
Franz Müller
BY
Knight Bros.
ATTORNEYS

INVENTOR.
Franz Müller
BY
Knight Bros.
ATTORNEYS

United States Patent Office 2,785,886
Patented Mar. 19, 1957

2,785,886

METHOD AND APPARATUS FOR PREHEATING CEMENT RAW MATERIAL BY KILN EXIT GASES

Franz Müller, Refrath, Bezirk Koln, Germany, assignor to Klöckner-Humboldt-Deutz Aktiengesellschaft, Koln-Deutz, Germany, a German corporation Application December 1, 1953, Serial No. 395,551

Claims priority, application Germany February 4, 1953

17 Claims. (Cl. 263—32)

The invention relates to methods and apparatus for heating pulverulent material and, in a more particular aspect, for preheating cement raw material by the exit gases of a rotary kiln to which the material is being supplied.

It is known to preheat cement raw material by passing the hot exit gases of a cement kiln through a number of serially interconnected cyclone-type heat exchangers and feeding the cement raw material through the cyclones into the kiln in counterflow to the gases. The apparatus needed for this known method has a large total height and demands correspondingly large expenditures in structural material.

The known method and apparatus also involve problems due to the fact that the preheated material may tend to soften or agglomerate. If the temperature of the material travelling through the preheating apparatus increases to approximately the calcining temperature, the surfaces of the grains of material become adhesive so that the material, even though only locally, may adhere to the surfaces of the apparatus or may agglomerate to a coarser consistency. If an excessive amount of material adheres to the inner surfaces of the lower portions of the cyclone-type separators or to the material-conveying pipes, the flow of material may become restricted or interrupted; and if excessive agglomeration occurs, this may interfere with the proper entrainment of the material into the conveying stream of the kiln exit gases. The possibility of becoming excessively adhesive and of premature agglomeration is most likely to occur between the preheating apparatus and the kiln, that is, in the feed pipe that conveys the material at a high temperature into the kiln. For that reason, the feed pipe has been water cooled, but this removes an appreciable amount of heat and hence noticeably reduces the efficiency of the entire apparatus.

It is, generally, the aim of my invention to minimize or eliminate the above-mentioned shortcomings without foregoing the advantages of efficient heat utilization.

More particularly, it is an object of my invention to reduce the overall height of the equipment and of the building required for mounting the equipment.

Another object of the invention is to reduce the danger of the material adhering to the inner surfaces of the separators and material-conveying pipes as well as to place the travelling material into better condition for reliable entrainment by the ascending stream of gases passing into the separators.

To achieve these ends, and in accordance with my invention, I force the exit gases from the rotary kiln upwardly through a cyclone-type separator, or preferably a series of such separators, introduce the material into the gas stream entering each separator so that the material after being preheated by the gas stream will precipitate in the separator, and I pass through the precipitated material another gas, preferably air, of a lower temperature and of a much smaller quantity than the exit gases, whereafter I convey the gas-permeated material along its path toward the kiln. Preferably, the gas of lower temperature is applied to the precipitated material on its path from the lowermost separator to the kiln. According to another feature of the invention, however, I additionally apply the cooling gas also to the material coming from one or more of the other separators so that the material is in gas-permeated condition when being entrained by the stream of exit gases entering the separators.

For thus passing a gas through the granular material separated from the various portions of the kiln-gas stream, and in accordance with other features of the invention, I provide a plate or other supporting structure of porous substance at the proper places along the conveyance path of the separated material, and I provide means for forcing the extraneously supplied gas through the permeable plate structure. According to a more specific feature of my invention, such a gas-permeable structure is disposed in, or forms part of, the lower portion of a cyclone separator of the preheating apparatus. According to another feature of the invention, such a gas-permeable structure is mounted in, or forms part of, the conveying conduit or flue which conveys the exit gas from the kiln into the preheating apparatus and through which the preheated material passes from the lowermost separator into the kiln.

By thus permeating the granular material with gas of lower temperature than obtaining in the preceding separator of the apparatus, the grain faces of the material are slightly but sufficiently cooled to prevent them from becoming adhesive, and the material assumes a better fluidity as well as a reduced agglomerating tendency. This results in a rapid and unrestricted flow of the material through the material-conveying pipes between the separators or from the lowermost separator into the kiln, and it also results in a more reliable entrainment and better distribution of the material in the stream of kiln exit gases. The introduction of the low-pressure, low-volume gas into the system does not appreciably reduce the temperature of the bulk of the material and hence does not impair the overall efficiency.

Due to the just-mentioned effects of the extraneous gas supply, a rapid movement of the preheated material in the material-conveying means can be secured at a smaller conveying angle than heretofore needed. This permits appreciably reducing the overall height of the preheating system. Therefore, according to another feature of the invention, the feed pipe for conveying the preheated material from the lowermost cyclone separator into the kiln enters into an only slightly inclined or almost horizontal conduit that leads into the flue end of the rotary kiln and is subdivided by a gas porous partition into an upper chamber for the material and a lower chamber for supplying compressed air through the partition to the material being conveyed.

According to still another feature of the invention, the stationary flue structure of the kiln comprises a gas-from-dust separator chamber approximately on the same level as the feed end of the kiln. A gas outlet conduit connects the chamber with a higher separator whose dust-discharge pipe enters into the kiln flue structure; and the flue structure, including the separator chamber, has gas-permeable partition means for passing an extraneous gas, such as compressed air, into the material flowing along the partition means into the kiln from the separator chamber and from the dust-discharge pipe.

These and other features of my invention, particularly pointed out in the claims annexed hereto, will be apparent from the embodiments exemplified by the drawings and described in the following. In the drawings:

Fig. 9 is a partly sectional side elevation of still another modification of the kiln-adjacent portion of a plant otherwise similar to Fig. 1; while

Figure 1:
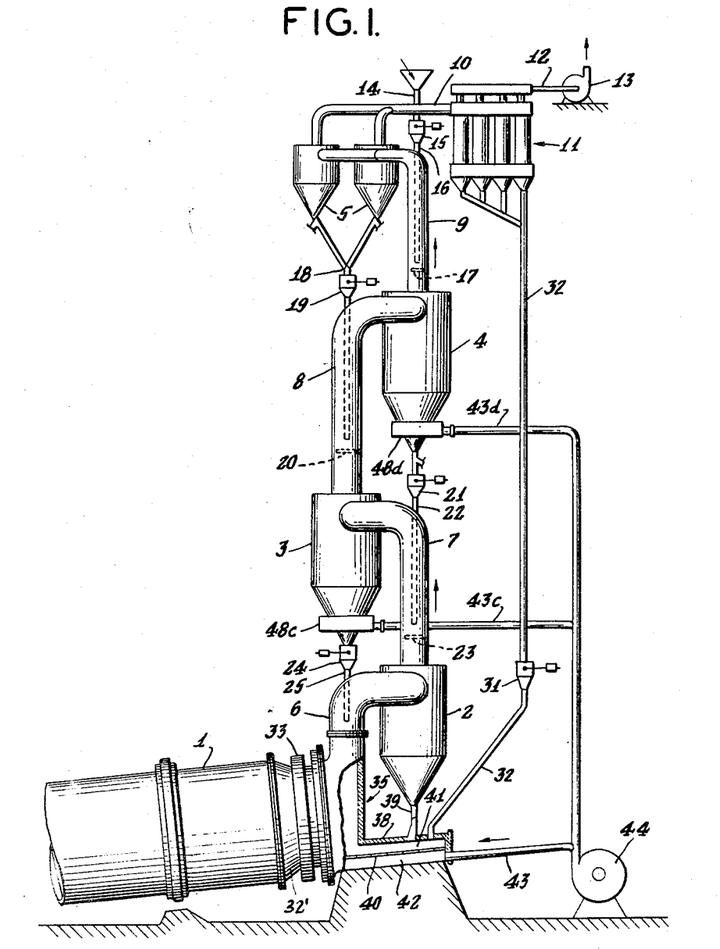
Fig. 1 is a schematic diagram of a cement processing plant comprising a rotary kiln and a preheating apparatus.

The apparatus shown in Fig. 1 comprises a rotary kiln 1 and a series of separators 2, 3, 4 and 5 positioned in a generally vertical arrangement extending upwardly from the kiln. A gas conduit 6 extends from the kiln gas outlet to the tangential gas inlet of separator 2. The gas outlet of separator 2 is connected to the gas inlet of separator 3 by a gas conduit 7; and, in a like manner, separators 3 and 4 are interconnected by a gas conduit 8, and separators 4 and 5 by a gas conduit 9. The separator 5 may be composed of two smaller separators as shown, or it may consist of a single separator, depending upon the material loading of the gas stream in the conduit 9. The separator 5 is connected through a conduit 10 to a dust collecting system 11 and thence through a conduit 12 to the suction side of a blower 13.

Pulverulent cement raw material in a supply hopper discharges through a pipe 14 into a gas seal 15. A pipe 16 extends from gas seal 15 to within the gas conduit 9. A distribution plate 17 is positioned beneath the discharge end of pipe 16 and diffuses the material for entrainment in the gas stream flowing upwardly from separator 4 to separator 5. The entrained material increases in temperature as it is being conveyed by the hot gas stream in conduit 9, and further heat transfer takes place as the material is being separated from the rotating gas stream in separator 5. A material conveying pipe 18 provided with a gas seal 19 extends from the material outlet of separator 5 into the gas conduit 8. The material, discharging from pipe 18 onto a distribution plate 20, is entrained in the gas stream coming from separator 3 and is conveyed by the gas stream to the separator 4 wherein the temperature of the material is further increased by the hotter gases discharging from the separator 3. The separated material discharges from separator 4 through a gas seal 21 into the gas conduit 7 by means of a pipe 22. The material discharged from pipe 22 onto a distribution plate 23 is conveyed to the separator 3 in the same manner as previously described for the other separators. The separated material discharges from separator 3 into the gas conduit 6 through a gas seal 24 and a pipe 25 also in the manner previously described.

Figure 3:
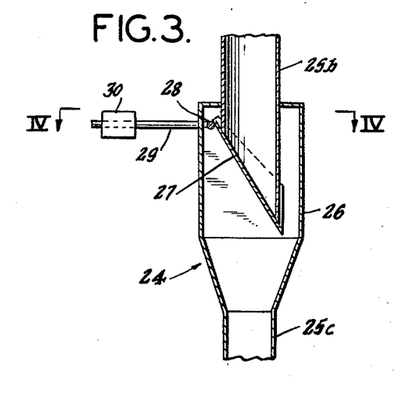
Fig. 3 is a sectional view of a gas sealing device used in the plant.
Figure 4:
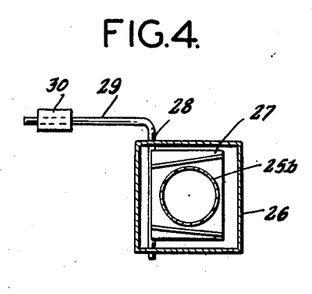
Fig. 4 shows a sectional view along the line IV—IV in Fig. 3.

The various gas seals, such as the gas seal 24, may all have the same design, for instance, the one shown in Figs. 3 and 4. The gas seal 24 comprises a housing 26. A material inlet pipe 25b extends into the interior of the housing. A material outlet pipe 25c extends downwardly from the bottom of the housing. Pipe 25b has a slanted discharge opening in housing 26 closed by a flap gate 27 pivoted on a rotatable shaft 28. Attached to shaft 28 and extending outwardly therefrom is a moment arm 29 provided with a displaceable weight 30. Arm 29 and weight 30 keep the flap gate 27 closed against the opening of pipe 25b. When the material in pipe 25b accumulates to a height sufficient to open the valve 27 against the weight 30, material will flow from pipe 25b into pipe 25c. The material in pipe 25b then continues to flow as long as the required height of material is maintained above the valve 27. The accumulation of material in pipe 25b prevents any gas from entering, or if there is insufficient material in pipe 25b, the gate valve 27 closes and thereby prevents any gas from entering into the pipe 25b.

Another dust seal 31, for instance also of the design just described, is disposed in a dust return pipe 32 that connects the dust collector system 11 with the feed end of the kiln 1 (Fig. 1).

Figure 2:
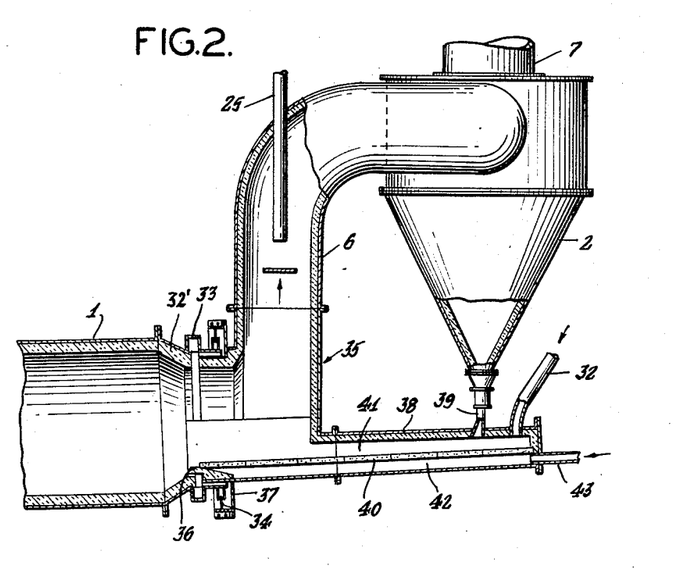
Fig. 2 is a side elevation, partly in section, of the kiln-adjacent portion of the same plant.

The flue portion of the kiln, including the lowermost separator, is shown more in detail in Fig. 2. The rotary cylinder-shaped portion of the kiln has a tapering end 32' carrying an annular housing 33. Mounted on housing 33 are the rotating elements of a labyrinth-type gas seal 34. The stationary flue structure 35 of the kiln forms an elbow-shaped communication between the kiln opening and the gas conduit 6 and has at its bottom a trough- or spout-shaped projection 36 entering into the kiln opening. The flue structure carries an annular support 37 for the stationary elements of the labyrinth gas seal 34. An extension 38 of the flue structure forms a conveying duct of a substantially rectangular or square cross section and extends between the material outlet 39 of the lowermost separator 2 and the trough portion 36 of the flue structure. A wall 40 composed of porous, gas-permeable plates divides the duct portion 38 into an upper chamber 41 for conveying the cement material and a lower chamber 42 enclosed by the sheet-metal shell of the flue structure. A pipe line 43 communicates with chamber 42 to supply it with compressed air from a blower 44 (Fig. 1). When in operation, the duct chamber 41 (Fig. 2) is filled with pulverulent cement material issuing from pipes 39 and 32 so that the interior of separator 2 is gas sealed from the stream of kiln exit gases passing into conduit 6; but the material, permeated by air, is then in motion and, due to its gravity, flows along the somewhat inclined wall 40 and through the trough portion 36 into the kiln. If desired, and depending upon the particular operational conditions, compressed air from blower 44 may also be supplied to one or more of the upper separators as will be described in a later place.

In the operation of the apparatus, the hot gases discharge from the kiln 1 through the conveying duct 6 into the separator 2 and flow upwardly and serially from separator 2 through the separators 3, 4 and 5 before the spent gases pass through the dust collecting system 11 and the blower 13 into the atmosphere.

Raw cement material in pulverulent form passes from the supply hopper through seal 15 and pipe 16 into the conduit 9 where the material is entrained in the gas stream discharging from the separator 4 and is conveyed into the separator 5. The material thus being conveyed is heated by the hot gases. The material precipitated in the separator 5 discharges through pipe 18 and trap 19 into the gas conduit 8. In conduit 8, the material is entrained in the gas stream entering the separator 4. In a like manner the material is discharged from separator 4 and is conveyed into the separator 3 through the gas conduit 7; and the material separated from the gas stream in separator 3 is conveyed through pipe 25 into the conveying duct 6. The gas stream discharging from the kiln 1 entrains the material and conveys it into the separator 2 from which the material is deposited upon the upper surface of the porous wall 40. With each transfer of material from one separator to the next lower separator the material assumes a higher temperature as it progresses downwardly through the hotter gases toward the kiln 1.

Air under pressure in chamber 42 is forced through the gas porous wall 40 into the material deposited thereon in the material chamber 41 of duct 38. This air has a relatively low pressure and a small volumetric quantity and is substantially diffused at a uniform rate as it passes through the porous wall into the material. The material on the upper surface of the porous wall, kept fluid by the air, flows into the mouth of the kiln 1. The dust separated in the dust collecting system 11 and conveyed onto wall 40 through pipe 32 is likewise conveyed into the kiln along the porous wall 40. The angle of inclination of the gas porous wall 40 is substantially the same as, or slightly greater than, the angle of repose of the cement raw material when aerated. This angle of inclination is sufficient to permit the material to flow by gravity along the upper surfaces of the porous walls without clogging. While the low-pressure air diffused through the porous wall 40 is not of a sufficient quantity to appreciably lower the temperature of the preheated material, it suffices to slightly cool the grain surfaces of the material to minimize any adhesive characteristics produced by the higher preheating temperatures.

The angle of inclination of the porous wall 40 is substantially smaller than the angle of inclination of the conventional kiln feed pipe. As a result, the overall height of the apparatus is considerably reduced. As stated above, the angle of inclination of the porous wall 40 may be approximately equal to the angle of repose of the material when aerated. This angle is normally from two to five degrees, while the angle of inclination of the conventional material feed pipe is at least approximately sixty degrees to the horizontal.

Figure 5:
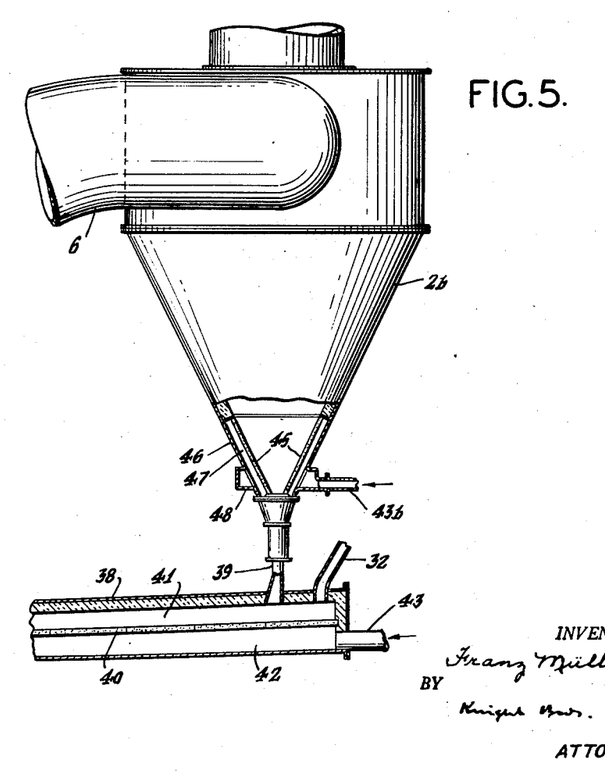
Fig. 5 is a part-sectional side elevation of a modified form of the kiln-adjacent portion of a plant otherwise similar to that of Fig. 1.

The modification shown in Fig. 5 is generally comparable with the kiln-adjacent devices of Fig. 2, the same reference numerals being applied in both illustrations to respectively similar elements. However, the structure of separator 2b in Fig. 5 differs from the conventional cyclone designs as follows.

The lowermost funnel portion of the cyclone separator of Fig. 5 is lined with a gas porous wall structure 45 in spaced relation to the outer shell 46 so as to form an enclosed interstitial gas chamber 47. An annular housing 48 communicates with the annular chamber 47 and has a nipple connected to an air pressure supply pipe 43b for connection to the pressure line of the blower 44 (Fig. 1). The separator 2b (Fig. 5) is thus inherently operative as an aerating device for preventing the precipitated pulverulent material from becoming adhesive. This further improves the fluidity of the material and prevents it from premature agglomeration. It will be understood that such a separator may be used with a conventional kiln flue structure in conjunction with any suitable gas seal between the material outlet of the separator and the kiln, and that such a separator is also suitable for uses other than that specifically described. Reverting to Fig. 1, it will be seen, for instance, that one or more of the other separators (3, 4, 5) of the illustrated apparatus may also be designed like the separator shown in Fig. 5. Thus, the separators 3 and 4 in Fig. 1 are shown to have such a design, the respective air pressure means being indicated at 48c, 43c and 48d, 43d.

The provision of air supply means for separator 3 or 4 has the advantage that the material separated in each separator is first placed in gas-permeated condition and hence is better suitable for dispersion and gas entrainment before it is discharged into the stream of kiln gases entering the next lower separator.

Figure 6:
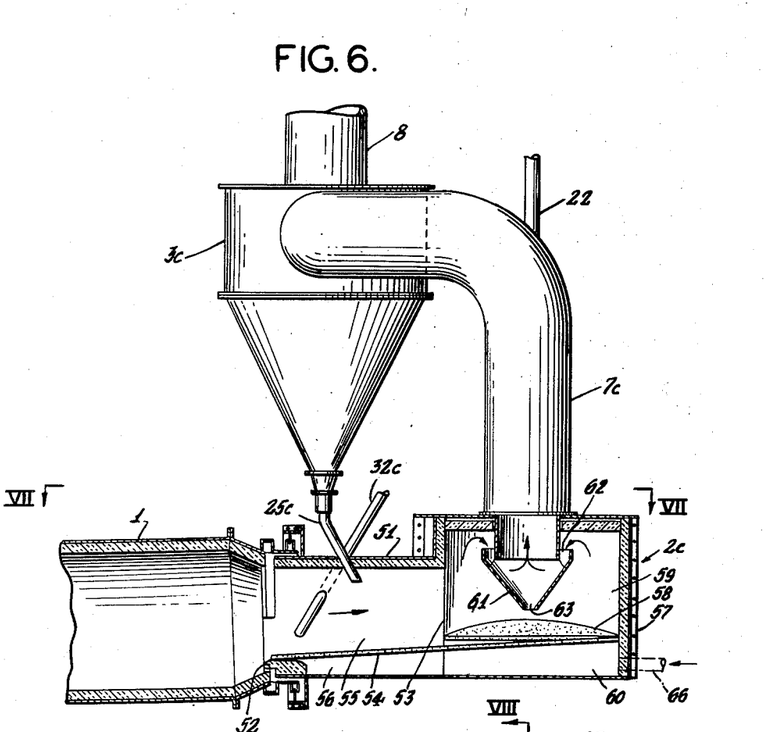
Figs. 6 and 7, respectively, are a partly sectional side elevation and a sectional top view of another modification of the kiln-adjacent portion, the section of Fig. 7 being taken along the line VII—VII in Fig. 6.
Figure 7:
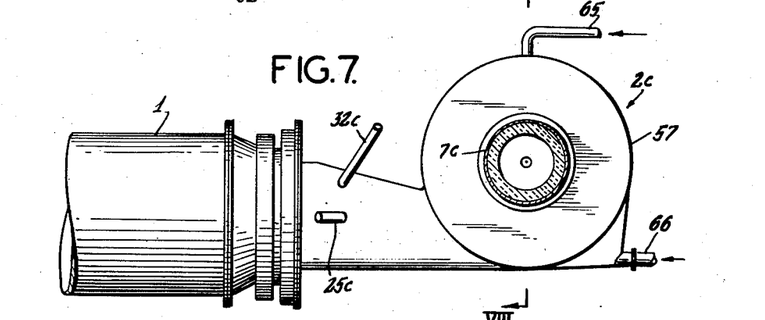
Figure 8:
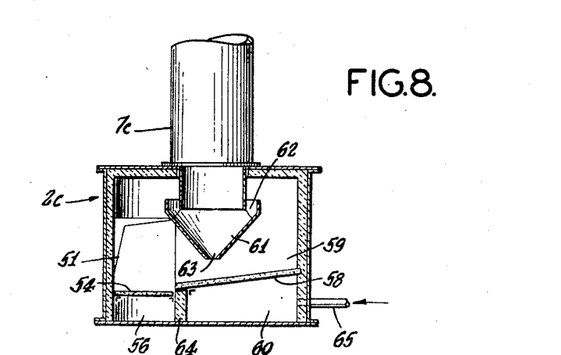
Fig. 8 shows another sectional view of the same modification along the sectional plane indicated by line VIII—VIII in Fig. 7.

The modification shown in Figs. 6, 7 and 8 involves another novel type of centrifugal dust-from-gas separator and also an advantageous integration of such a separator into the stationary flue structure of a rotary kiln.

According to Figs. 6 to 8, the lowermost separator, here designated by 2c, is located at approximately the same elevation as the feed-end and flue structure of the kiln. This results in a further reduction in the overall height of the plant as the next higher separator 3c need not be given a higher elevation than that occupied by separator 2 in Fig. 1. In other respects the apparatus is similar to that of Fig. 1 with the exception of the features described presently.

The flue structure according to Figs. 6 to 8 forms a conveying gas duct 51 adjacent to the kiln 1 and communicates with the interior of the kiln by a projection 52 (Fig. 6) extending into the mouth opening of the kiln. The conveying duct 51 connects the kiln with the inlet opening 53 of the separator 2c. A gas porous wall 54 (Figs. 6, 8) between top and bottom of the conveying duct 51 divides the duct into an upper material chamber 55 and a lower plenum chamber 56. The porous wall 54 extends from the separator 2c into the mouth of the rotary kiln 1.

The separator 2c comprises a housing 57 and has a gas porous wall 58 positioned between top and bottom of the housing (Figs. 6, 8). The porous wall 58 divides the separator 2c into a material chamber 59 and a plenum chamber 60. A gas conduit 7c projects downwardly into the interior of the separator 2c through an opening in the top of the separator housing. A conical gas deflector 61 is positioned below the internal inlet end of the conduit 7c and has an annular gas inlet opening 62 and a material outlet opening 63.

The plenum chambers 56 and 60 are separated from each other by a partition 64 (Fig. 8). Air is admitted into the plenum chamber 56 through an air supply pipe 66 (Figs. 6, 7), and air is admitted into the plenum chamber 60 through an air supply pipe 65 (Figs. 7, 8).

The gas conduit 7c connects the gas outlet of separator 2c with the gas inlet of the next upper separator 3c. The material discharge pipe 25c of separator 3c projects into the flue duct 51 between the kiln and the separator 2c so that the material issuing from pipe 25c is entrained by the flue gases and conveyed into the separator 2c. The dust return pipe 32c from the dust collecting system (11 in Fig. 1) also enters into the duct 51 (Fig. 6) but its discharge opening is located lower than that of pipe 25c so that most of the dust from dust return pipe 32c will pass directly into the kiln since the stream of kiln gases has its highest velocity near the top of the flue duct and imposes little or no appreciable entraining force upon the material flowing through the bottom area of the duct.

During operation, the material entrained from pipe 25c into the separator 2c precipitates in separator 2c onto the porous wall 58 and flows along that wall into the kiln, and the dust returned from the dust collection system will flow along the porous wall 54 into the kiln, the air permeating these flows of material being effective to maintain the material in fluid and non-agglomerated condition.

It will be recognized that by virtue of the elimination of the conical bottom of the conventional type of separator, the separator 2c can be positioned directly opposite the mouth of the kiln to permit a substantial reduction in the overall height of the preheating apparatus.

Figure 9:
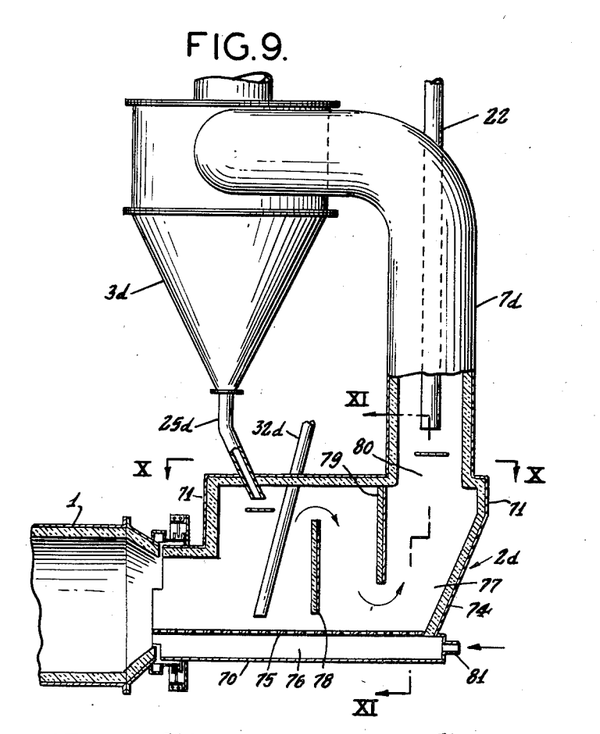
Figure 10:
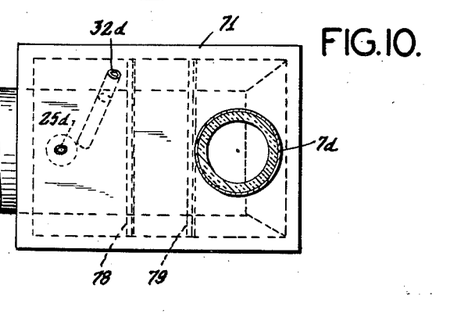
Fig. 10 is a sectional view along the line X—X in Fig. 9.
Figure 11:
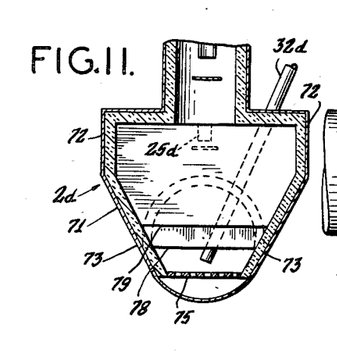
Fig. 11 is a sectional view along the line XI—XI in Fig. 9.

The modified form of the lowermost separator 2d shown in Figs. 9, 10 and 11 includes a stationary conveying duct 70 which is positioned opposite the truncated end of the kiln 1 and joins the interior of the kiln with the separator 2d. The separator 2d comprises a housing 71 having vertical walls 72, sloping bottom walls 73, and a sloping end wall 74. A gas porous wall 75 is positioned between the top and bottom of the separator housing and extends from the sloping end wall 74 into the mouth of the kiln 1. The porous wall 75 divides the housing 71 into a plenum chamber 76 and a material chamber 77. A partition wall 78 is positioned across the housing 71 between the two side walls 73 and above the porous wall 75. A second partition wall 79 is positioned across the housing 71 between the two side walls 73. The partition wall 79 extends from the top of the housing downwardly and terminates above the porous wall 75. An opening 80 in the top of the housing 71 communicates with the gas conduit 7d leading to the next higher separator 3d.

When the apparatus is in operation, the hot gases discharge from the kiln 1 into the separator 2d. The gas stream entrains the material being discharged from the separator 3d through the material discharge pipe 25d, thus transferring heat from the kiln gases to the material. The material-laden gas stream must follow a tortuous path over and under the partitions 78 and 79 before passing out of the separator through opening 80 into the gas conduit 7d. With each change of direction, material is separated from the gas stream as it passes over and under the partitions. The material separated will fall to the upper surface of the porous wall 75. Air is admitted through a conduit 81 into the plenum chamber 76 and passes through the porous wall into the material on the upper surface of the wall. The material thus kept in fluid condition flows by gravity along the wall into the mouth of the kiln.

The dust separated in the dust collecting system (11 in Fig. 1) is discharged into the interior of the flue duct through the dust return pipe 32d. The material falls onto the porous wall 75 and flows also into the kiln 1 along the upper surface of the porous wall.

It will be apparent to those skilled in the art, upon a study of this disclosure, that the invention permits of various embodiments and modifications other than those specifically described, and that the novel separators and flue-separator combinations according to the invention may be applied for uses other than the preheating of cement raw material, without departing from the essence of the invention and within the scope of the claims annexed hereto.

I claim:

1. The process of preheating pulverulent material by hot exit gases from a kiln to which the material is being supplied, which comprises forcing the gases from the kiln upwardly through a series of cyclone separators, introducing the raw material into the gas stream entering one of the separators so that the material is conveyed into said separator and thereafter separated from the gas stream in said separator, passing through the separated material another gas of a lower temperature than that of the gas stream, and thereafter discharging the gas-permeated material back into the gas stream at a point where it flows toward a lower one of the separators, and conveying the material from the lowermost separator into the kiln.

2. The process of preheating pulverulent material by hot exit gases from a kiln to which the material is being supplied, which comprises forcing the gases from the kiln upwardly through a series of cyclone separators, introducing the raw material into the gas stream entering the uppermost separator, discharging the material separated in each upper separator into the gas stream entering the next lower separator, passing through the material separated in the lowermost separator another gas of a lower temperature than that of the gas stream for cooling the grain surfaces of the material, and thereafter conveying the material into the kiln.

3. The process of preheating pulverulent material by hot exit gases from a kiln to which the material is being supplied, which comprises forcing the gases from the kiln upwardly through a series of cyclone separators, introducing the raw material into the gas stream entering the uppermost separator, passing through the material separated in each upper separator another gas of lower temperature than that of the gases in the respective separators to thereby cool the grain surfaces of the material, discharging the gas permeated material into the gas stream entering the next lower separator, and conveying the material from the lowermost separator into the kiln.

4. A method of conditioning cement raw material in the manufacture of cement clinker in rotary kilns which comprises, forcing the kiln waste gases serially and upwardly through a series of vertically spaced separators, introducing the material into the gas flow entering the uppermost separator, discharging separated material from each upper separator into the gas flow entering the next lower separator, passing the separated material from the lowermost separator into a container onto a gas-permeable porous wall, continuously forcing a gas through the porous wall into substantially the entire area covered by the material at a pressure below that required to blow the material off the porous wall, and gravity feeding the material from the porous wall into the rotary kiln.

5. A method of conditioning cement raw material in the manufacture of cement clinker in a rotary kiln which comprises, forcing the kiln waste gases serially and upwardly through a series of vertically spaced separators, introducing the material into the gas flow entering the uppermost separator, discharging separated material from each upper separator into the gas flow entering the next lower separator, discharging the separated material from the lowermost separator onto a gas-permeable porous wall slightly inclined toward the kiln, continuously blowing a gas through the porous wall over substantially the entire area covered by the material and at a substantially uniform low pressure whereby the gas-permeated material will flow by gravity along the porous wall into the rotary kiln.

6. The method of separating pulverulent material carried in a flowing gas stream, which comprises separating the material from the gas stream in a dust-from-gas separator vessel, discharging the clean gas from the vessel, depositing the separated material on a gas-permeable porous wall inside the vessel, continuously passing a second gas through the porous wall into the entire area covered by the material on the porous wall and at a slight pressure insufficient to lift the material off the porous wall whereby the material is caused to flow by gravity from the vessel.

7. Apparatus for heating pulverulent material such as cement raw material by hot gases, comprising a kiln, a plurality of separators spaced vertically from each other, each separator having a lateral gas inlet and a vertical gas outlet, a material discharge pipe extending downwardly from the bottom of each separator except the lowermost separator, each lower separator having its gas outlet joined with the gas inlet of an upper separator to form a continuous ascending gas path, a source of material having a material-supply pipe extending into the conduit joined with the gas inlet of the uppermost separator, each upper separator having its material discharge pipe terminating within the gas inlet of a lower separator to form a serial path for the material, a conveying duct extending from the lateral gas inlet of the lowermost separator to the kiln and communicating therewith, a gas-permeable porous wall positioned between the top and bottom of the lowermost separator and dividing the separator into a lower plenum chamber and an upper material chamber, said porous wall extending through said conveying duct to said kiln and being slightly inclined over its entire length toward said kiln and gas supply means connected with said plenum chamber for forcing air from the plenum chamber through the porous wall into the material in the material chamber.

8. Apparatus for heating pulverulent material such as cement raw material by hot gases, comprising a kiln, a plurality of separators spaced vertically from each other, each separator having a lateral gas inlet conduit and a vertical gas outlet and a material discharge outlet, a gas-permeable porous wall positioned in the lower portion of each separator adjacent the material discharge outlet, a plenum chamber adjacent to each of said porous walls, each of said porous walls forming one wall of its adjacent plenum chamber, a material discharge pipe extending downwardly from the bottom of each separator, each lower separator having its gas outlet joined with the gas inlet of an upper separator to form a continuous ascending gas path, a material supply pipe extending into the gas inlet conduit of an upper one of said separators, each upper separator having its material discharge pipe terminating within the gas inlet conduit of a lower separator to form a descending path for the material, a conveying duct structure having a material inlet and a material outlet, a gas-permeable porous wall positioned between the top and bottom of said duct structure and dividing said structure into an upper material chamber and a lower plenum chamber, the material discharge pipe of the lowermost separator communicating with the material inlet of said duct structure, the material outlet of said duct structure communicating with the kiln, said porous wall in said duct structure extending from beneath said lowermost separator to said kiln for continuously gravity-conveying the material into said kiln, and gas supply means connected with said plenum chambers for forcing gas through the porous walls.

9. Apparatus for heating pulverulent material such as cement raw material by hot gases, comprising a kiln having a gas outlet and a material inlet, a preheater having a separator, said separator having a gas inlet and a gas outlet and a material outlet, a gas conveying duct connecting the kiln with the gas inlet of the separator, a material supply pipe terminating within the gas conveying duct, a trough structure having a material inlet and a material outlet, a gas-permeable porous wall positioned between the top and bottom of the trough structure and dividing the trough structure into a material chamber and a plenum chamber, the material outlet of the separator communicating with the material inlet of the trough structure, the material outlet of the trough structure communicating with the kiln, said porous wall extending beneath said separator and beneath said material supply pipe toward and down to said kiln for gravity-conveying material from said separator and from said supply pipe into said kiln, and gas supply means connected with the plenum chamber for forcing gas from the plenum chamber through the porous wall into the material on the porous wall.

10. Apparatus for heating pulverulent material such as cement raw material by hot gases, comprising a kiln having a gas outlet and a material inlet, a preheater having a gas-from-material separator, said separator having a gas inlet and a gas outlet and a material outlet, a gas conveying duct extending from the gas outlet of the kiln to the gas inlet of the separator, a material supply pipe terminating within the gas conveying conduit, a duct structure having an inlet and an outlet for material, a gas-permeable porous wall positioned between the top and bottom of said duct structure and dividing said duct structure into an upper chamber for the material to be conveyed and a lower chamber, said porous wall being inclined downwardly throughout its length from said inlet to said outlet at an angle at least equal to the angle of repose of said material being conveyed when aerated, the material outlet of the separator communicating with the material inlet of said duct structure, the material outlet of said duct structure communicating with the kiln, said porous wall extending toward and down to said kiln, and gas supply means connected with said lower chamber for forcing a gas through said porous wall at a substantially uniform pressure and rate throughout the length of said porous wall, whereby said material upon said porous wall is gas permeated and flows downwardly upon said porous wall by gravity to the kiln.

11. A gas-from-material separator, comprising a housing having an upper cylindrical portion and a lower conical and downwardly tapering portion, said cylindrical portion having a tangential inlet and an upwardly extending gas outlet, said conical portion having a downwardly extending outlet for separated material, a frusto-conical gas-permeable porous wall positioned in the bottom of said conical housing adjacent said material outlet so as to receive on its surface the material as it is being separated from the gas-material stream, a plenum chamber adjacent to said porous wall, said porous wall forming one wall of said plenum chamber, and gas supply means for forcing gas from said plenum chamber through said porous wall into the separated material.

12. A gas-material separator, comprising a housing having a gas-material stream inlet and a gas outlet and a material outlet, a gas-permeable porous wall positioned between the top and bottom of said housing and dividing said housing into a material chamber and a plenum chamber whereby the upper surface of said porous wall is adapted to receive material as it is being separated from the gas-material stream, said porous wall being inclined toward the material outlet at an angle at least as great as the angle of repose of the separated material when gas permeated, and means connected with said plenum chamber for forcing a gas from said plenum chamber through said porous wall into the material thereon.

13. A gas-material separator, comprising a housing having a gas-material stream inlet and a gas outlet and a material outlet, a gas-permeable porous wall positioned between the top and bottom of said housing and dividing said housing into an upper material chamber and a lower plenum chamber, a plurality of partitions spaced from each other in said housing and above said porous wall and forming together with said housing a tortuous path for the gas-material stream whereby the upper surface of the porous wall is adapted to receive material separated from the gas-material stream flowing through said path, and gas supply means connected with said plenum chamber for forcing a gas from said plenum chamber through said porous wall into the material thereon.

14. Apparatus for heating pulverulent material such as cement raw material by hot gases, comprising a kiln, a plurality of separators spaced vertically from each other, each separator having a lateral gas inlet conduit and a vertical gas outlet, a material discharge pipe extending downwardly from the bottom of each separator except the lowermost separator, each lower separator having its gas outlet joined with the gas inlet conduit of the next upper separator to form a continuous ascending gas path, a source of material having a material supply pipe extending into the gas inlet conduit of the uppermost separator, each upper separator having its material discharge pipe terminating within the gas inlet conduit of the next lower separator to form a descending path for the material, a conveying duct structure extending from said kiln to the lateral gas inlet of said lowermost separator, a first gas-permeable porous wall positioned between the top and the bottom of said lowermost separator and dividing said lowermost separator into a lower plenum chamber and an upper material chamber, a second gas-permeable porous wall positioned between the top and bottom of said conveying duct structure and extending from said lowermost separator to said kiln, said second porous wall dividing said duct structure into a plenum chamber and a material chamber, and means for forcing air from said plenum chambers through said porous walls into the material in said material chambers whereby the material is fluidized to flow by gravity along the upper surfaces of said porous walls into said kiln.

15. Apparatus for heating material such as cement raw material by hot gases, comprising a kiln, a container having a gas outlet, a conduit extending laterally from said container and connecting said container with said kiln, a first gas-permeable porous wall positioned between the top and bottom of said container and dividing said container into a lower plenum chamber and an upper material chamber, a second gas-permeable porous wall positioned between the top and bottom of said conduit and extending from said container to said kiln, said second porous wall dividing said conduit into a lower plenum chamber and an upper material chamber, each of said plenum chambers having gas supply means for forcing gas from said plenum chambers through said respective porous walls into material in said material chambers whereby the material is fluidized and flows by gravity along the upper surfaces of said porous walls into said kiln.

16. Apparatus for heating and conveying material such as cement raw material, comprising a kiln, a separator having a gas-material inlet and a gas outlet, a conduit extending laterally from said inlet and communicating with said kiln, a first gas-permeable porous wall positioned between the top and bottom of said separator and dividing said separator into a plenum chamber and a material chamber, a second gas-permeable porous wall positioned between the top and bottom of said conduit and extending from said first porous wall to said kiln, said second porous wall dividing said conduit into a plenum chamber and a material chamber, each of said plenum chambers having gas supply means for forcing gas from said plenum chambers through said porous walls into material in said material chambers whereby the material is fluidized and flows by gravity along the upper surface of said porous walls from said separator into said kiln.

17. Apparatus for heating and conveying material such as cement raw material, comprising a kiln, a separator having a gas-material inlet and a gas outlet, a conduit extending laterally from said inlet and communicating with said kiln, a first gas-permeable porous wall positioned between the top and bottom of said separator and dividing said separator into a lower plenum chamber and an upper material chamber, a second gas-permeable porous wall positioned between the top and bottom of said conduit and extending from said first porous wall to said kiln, said second porous wall dividing said conduit into a lower plenum chamber and an upper material chamber, said first porous wall being downwardly inclined toward said second porous wall, said second porous wall being inclined toward said kiln, each of said two porous walls having an angle of inclination at least as great as the angle of repose of the material being conveyed when gas permeated, and gas supply means connected with said plenum chambers for forcing gas from said plenum chambers through said porous walls into material in said material chambers whereby the material is fluidized and flows by gravity along the upper surface of said porous walls from said separator into said kiln.

References Cited in the file of this patent

UNITED STATES PATENTS

| | | |
|---|---|---|
| 2,657,100 | Weller | Oct. 27, 1953 |
| 2,663,560 | Muller et al. | Dec. 22, 1953 |

FOREIGN PATENTS

| | | |
|---|---|---|
| 51,926 | Denmark | July 27, 1936 |
| 642,426 | Great Britain | Sept. 6, 1950 |
| 715,103 | Germany | Dec. 13, 1941 |